United States Patent
Gwon et al.

(10) Patent No.: US 8,690,729 B2
(45) Date of Patent: Apr. 8, 2014

(54) METHOD AND DEVICE FOR CONTROLLING ISG LOGIC

(75) Inventors: Chongah Gwon, Hwaseong-si (KR); Sejun Kim, Seoul (KR); Jiyong Yu, Pocheon-si (KR); Junghwan Bang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 210 days.

(21) Appl. No.: 13/276,801

(22) Filed: Oct. 19, 2011

(65) Prior Publication Data

US 2012/0142491 A1 Jun. 7, 2012

(30) Foreign Application Priority Data

Dec. 7, 2010 (KR) .................. 10-2010-0124550

(51) Int. Cl.
*F16H 59/60* (2006.01)
*F16H 59/62* (2006.01)
*B60W 10/00* (2006.01)

(52) U.S. Cl.
USPC .............................. 477/94; 477/97

(58) Field of Classification Search
USPC .................. 477/94, 97, 115, 116; 701/65
See application file for complete search history.

(56) References Cited

U.S. PATENT DOCUMENTS

| | | | | |
|---|---|---|---|---|
| 5,052,531 A | * | 10/1991 | Bota | 192/219.1 |
| 6,275,759 B1 | | 8/2001 | Nakajima et al. | |
| 2004/0231951 A1 | * | 11/2004 | Hasegawa et al. | 192/220 |
| 2004/0262995 A1 | | 12/2004 | Hawkins | |
| 2005/0140208 A1 | | 6/2005 | Ji | |
| 2008/0125944 A1 | * | 5/2008 | Kamishima et al. | 701/54 |
| 2011/0082624 A1 | * | 4/2011 | Yamamoto | 701/41 |
| 2011/0218699 A1 | * | 9/2011 | Petzold | 701/22 |

FOREIGN PATENT DOCUMENTS

| | | | |
|---|---|---|---|
| JP | 2000-179389 A | | 6/2000 |
| JP | 2000-274273 A | | 10/2000 |
| JP | 2001-3778 A | | 1/2001 |
| JP | 2001-163087 A | | 6/2001 |
| JP | 2003-148309 A | | 5/2003 |
| JP | 2003-260960 A | | 9/2003 |
| JP | 2004-308579 A | | 11/2004 |
| JP | 2005-186928 A | | 7/2005 |
| JP | 2006-112322 A | | 4/2006 |
| JP | 2006-170150 A | | 6/2006 |
| JP | 2006170290 A | * | 6/2006 |
| JP | 2008-185022 A | | 8/2008 |
| JP | 2008-215293 A | | 9/2008 |
| JP | 2009-167889 A | | 7/2009 |

(Continued)

*Primary Examiner* — Tisha Lewis
(74) *Attorney, Agent, or Firm* — Morgan, Lewis & Bockius LLP

(57) ABSTRACT

A device for controlling ISG logic is mounted in a vehicle equipped with an ISG system. The device includes a brake pedal switch, a shift lever switch that shows the current state of a gear of the vehicle, an inclination sensor that is mounted in the vehicle and measures the inclination of a road where the vehicle is positioned, a controller that internally controls the vehicle to an N (Neutral) state, regardless of the gear range shown by the shift lever switch, for the vehicle on a downhill, in accordance with the measured inclination, and an engine unit that performed idle stop when the brake pedal becomes ON, with the gear of the vehicle at a D (Drive) sate, and restarts the stopped engine when the brake pedal becomes OFF, with the gear of the vehicle at the D state.

6 Claims, 3 Drawing Sheets

(56) References Cited

FOREIGN PATENT DOCUMENTS

| | | |
|---|---|---|
| JP | 2010-77904 A | 4/2010 |
| JP | 2010-84841 A | 4/2010 |
| KR | 2000-0004073 U | 2/2000 |
| KR | 2002-0008408 A | 1/2002 |
| KR | 10-0897040 B1 | 5/2009 |
| KR | 10-2009-0108422 A | 10/2009 |
| KR | 10-2010-0050786 A | 5/2010 |
| KR | 10-2010-0065885 A | 6/2010 |

* cited by examiner

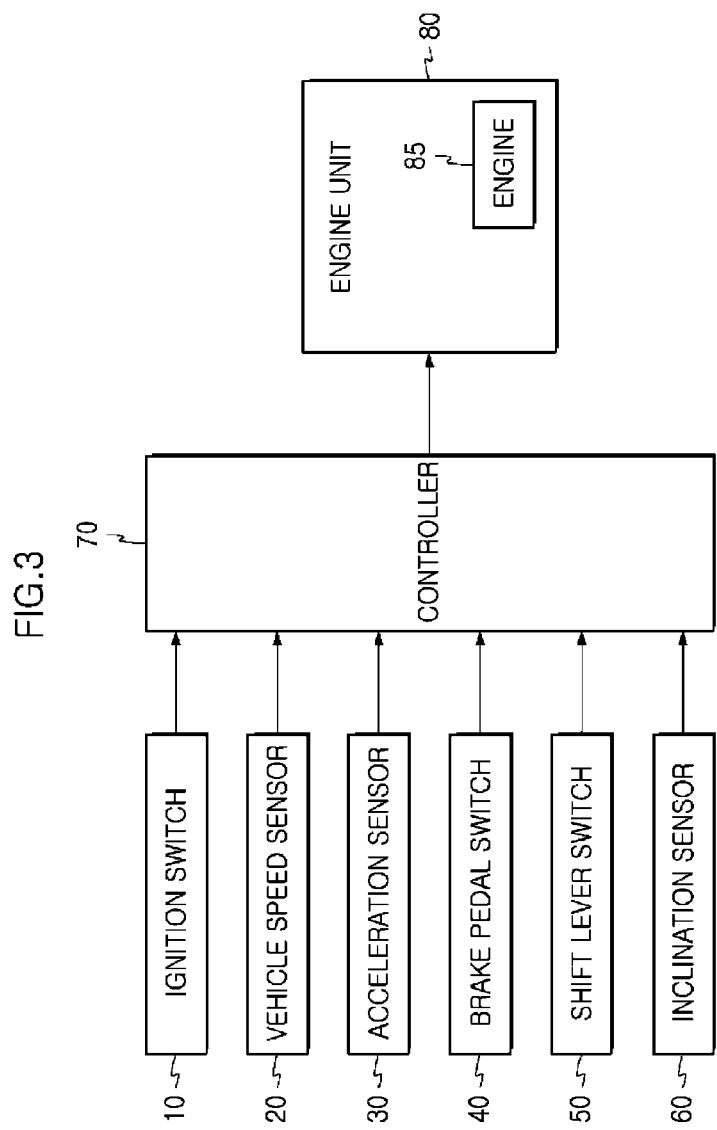

METHOD AND DEVICE FOR CONTROLLING ISG LOGIC

CROSS-REFERENCE TO RELATED APPLICATIONS

The present application claims priority to Korean Patent Application Number 10-2010-0124550 filed Dec. 7, 2010, the entire contents of which application is incorporated herein for all purposes by this reference.

BACKGROUND OF INVENTION

1. Field of Invention

The present invention relates to a method and a device for controlling ISG logic, and more particularly, to a method of controlling ISG (Idle Stop & Go) logic of an ISG vehicle which automatically stops the engine idling when the vehicle stops, and restarts the engine after a predetermined time to start the vehicle.

2. Description of Related Art

The gases causing the greenhouse effect of the various gases in the atmosphere are called greenhouse gases. As the greenhouse gases, there are carbon dioxide, methane, nitrous oxide, Freon gas, and ozone. Although vapor is the most responsible for causing the natural greenhouse effect, a representative greenhouse gas causing global warming is carbon dioxide.

Since the latter half of $20^{th}$ century, global warming has rapidly progressed, unusual weather such that localized heavy rain, drought, typhoon etc. has been rapidly increased. If the present level of contamination continues, it is expected that the greenhouse gas emissions throughout the world will reach a level that seriously threatens mankind and the eco-system in the sooner future.

Therefore, international cooperation for reducing amount of greenhouse gases has been established to cope with global warming due to the greenhouse gases.

Various efforts have been made to reduce the greenhouse gases in the transportation field, and as a part of the efforts, a great deal of effort is made in improving fuel efficiency.

At the present time where the fuel efficiency is a central theme, use of an ISG (Idle Stop & Go) system is increasing over the world.

The ISG system gives an order to stop an engine in idling, on the basis of information on vehicle speed, the revolution speed of an engine, and the temperature of cooling water etc.

In other words, the ISG system is an engine control system that is provided with a function that automatically stops the idling engine when a vehicle stops for waiting the traffic lights in a town, and restarts (goes) the engine when starting the vehicle after a predetermined time to make normal operation possible.

The ISG system is also called an idling stop control device. The ISG system can achieve fuel effect of about 5~15% in the actual fuel efficiency mode.

A vehicle equipped with the ISG system is called an ISG vehicle, Although the highest prior object of the ISG is to improve the fuel efficiency, forbidden conditions may be set by inclination conditions and battery conditions in order to improve safety and commercial value of the vehicle system.

Referring to FIG. 1, FIG. 1 is a flowchart illustrating a general process of idle stop & go of a vehicle equipped with an automatic transmission.

A common vehicle with an automatic transmission should be equipped with a sub-oil pump to implement the ISG system and the sub-oil pump is used to keep the hydraulic pressure of the transmission when the engine stops.

In the vehicle provided with the ISG system by being equipped with the sub-oil pump, the engine is stopped (S130), when the brake pedal is pressed down to stop the vehicle at the D-range ("Yes" in S110) while an idle stop entrance condition is determined (S100). In this process, the sub-oil pump operates to keep the hydraulic pressure of the transmission.

That is, the condition for starting to stop the engine by the ISG system is that the vehicle stops with the vehicle speed not detected, the gear is held at the D-range, and the brake pedal is operated and kept at a predetermined time, in which the engine is stopped to increase the fuel efficiency.

Thereafter, when the brake pedal is released at the D-range, with the vehicle stopped ("Yes" in S150), the engine is automatically restarted (S170). In this state, the sub-oil pump is turned off.

That is, with the engine stopped by the ISG system, when the user's intention of starting the vehicle, such as releasing the brake pedal and operating the acceleration pedal, is detected, the engine is turned on to maintain normal traveling.

In the ISG vehicle described above, the logic controlling the ISG system should be changed for a level ground or an uphill, in order to keep the safety of the vehicle system, in accordance with the inclination of the road where the ISG vehicle is positioned now.

In particular, ISG logic control that can ensure stable start while preventing the vehicle from moving down for the movement characteristic of the vehicle, when restarting the vehicle, on a downhill.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method and a device for controlling ISG logic, accurately considering the inclination, in accordance with the inclination of the road where an ISG vehicle is positioned now.

Further, the present invention has been made in an effort to provide a method and a device for controlling ISG logic which can ensure stable start of an ISG vehicle even on a downhill.

Various aspects of the present invention provide for a method of controlling ISG logic, which comprises (a) determining whether a brake pedal becomes ON, with a gear at a D (Drive) state while an ISG vehicle travels, (b) determining whether a road is a downhill, by measuring the inclination of the road with a inclination sensor mounted in the ISG vehicle, when the brake pedal becomes ON in the step (a), (c) internally controlling the vehicle to an N (Neutral) state, regardless of the gear at the D state, when the road is determined as a downhill in the step (b), (d) determining whether the brake pedal becomes OFF, with the gear at the D state, and (e) internally switching the vehicle from the N state to the D state, when the brake pedal becomes OFF in the step (d).

In the step (c), the internally controlling of the vehicle to the N state may include keeping the hydraulic pressure of a transmission oil sub-pump at the minimum level.

The step (e) may delay internally switching the vehicle from the N state to the D state and may further include controlling engine torque under a predetermined value.

Other aspects of the present invention provide for a device for controlling ISG logic that is mounted in a vehicle equipped with an ISG system, the device including a brake pedal switch, a shift lever switch that shows the current state of a gear of the vehicle, an inclination sensor that is mounted in the vehicle and measures the inclination of a road where the vehicle is positioned, a controller that internally controls the vehicle to an N (Neutral) state, regardless of the gear range shown by the shift lever switch, for the vehicle on a downhill, in accordance with the measured inclination, and an engine unit that performed idle stop when the brake pedal becomes ON, with the gear of the vehicle at a D (Drive) state, and restarts the stopped engine when the brake pedal becomes OFF, with the gear of the vehicle at the D state.

The controller may keep the hydraulic pressure of a transmission oil sub-pump the minimum, when internally controlling the vehicle to the N state, internally switch the vehicle from the N state to the D state, when the brake pedal becomes OFF, with the gear of the vehicle at the D state, and delay switching to the D state.

The controller may control engine torque under a predetermined value, when the brake pedal becomes OFF, with the gear of the vehicle at the D state.

According to various aspects of the present invention, it is possible to control the ISG logic in consideration of the inclination, in accordance with the inclination of the road where the ISG vehicle is positioned now, by measuring the inclination of the road with the inclination sensor in the ISG vehicle.

Further, according to various aspects of the present invention, it is possible to provide a method of controlling ISG logic which can ensure stable start of the ISG vehicle even on a downhill, by internally controlling the transmission to the neutral state, when the ISG vehicle is on a downhill.

Furthermore, according to various aspects of the present invention, it is possible to ensure stability in movement of the vehicle, without an impact due to shifting, by internally delaying shifting the vehicle and limiting the engine torque under a predetermined value, in restarting the engine.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a block diagram illustrating the configuration of an exemplary device for controlling ISG logic according to an the present invention.

Figure 1:
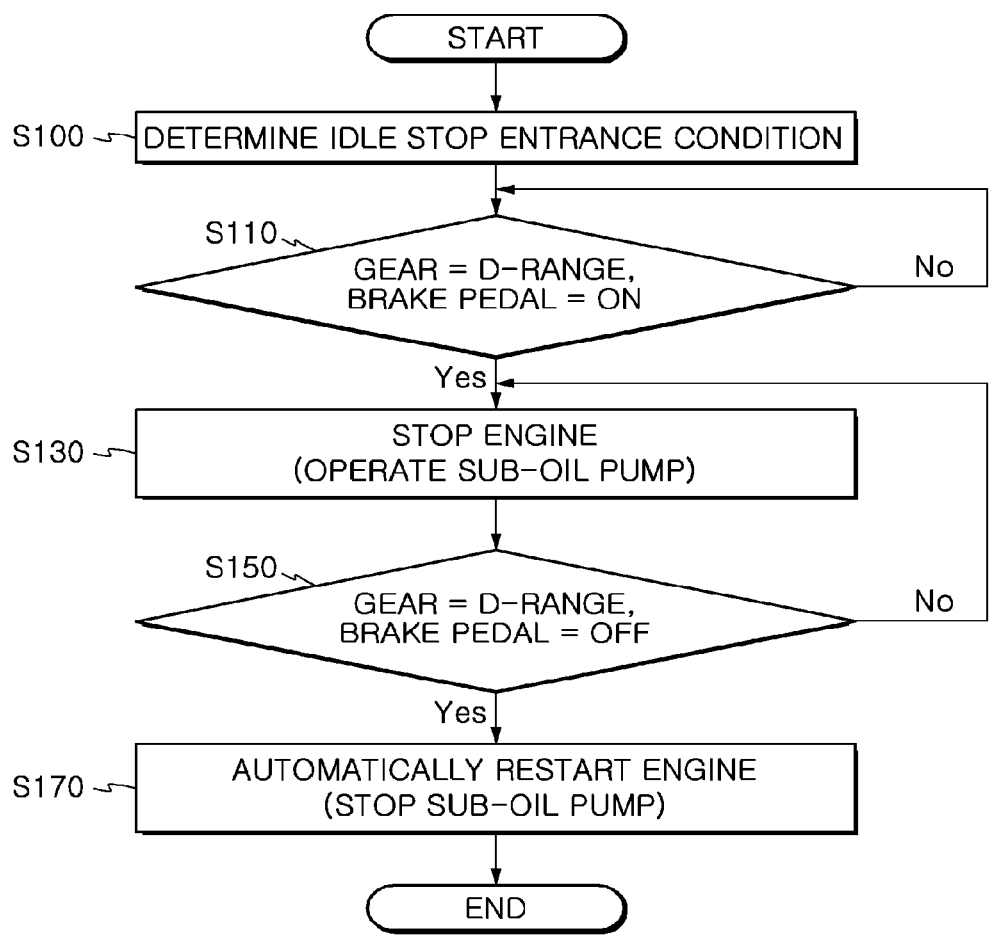
FIG. 1 is a flowchart illustrating a general process of idle stop & go of a vehicle equipped with an automatic transmission.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a method of controlling ISG logic according to various embodiments of the present invention is described in detail with reference to FIG. 2.

It is assumed that the vehicle described hereafter is a vehicle equipped with an ISG system. For example, it is assumed that the vehicle is provided with a button for operating the ISG logic on the instrument panel in front of the driver's seat, such that the ISG logic operates when the button is pushed, or even if there is not the button, when the vehicle stops, the ISG logic is automatically operated after a predetermined time.

Figure 2:
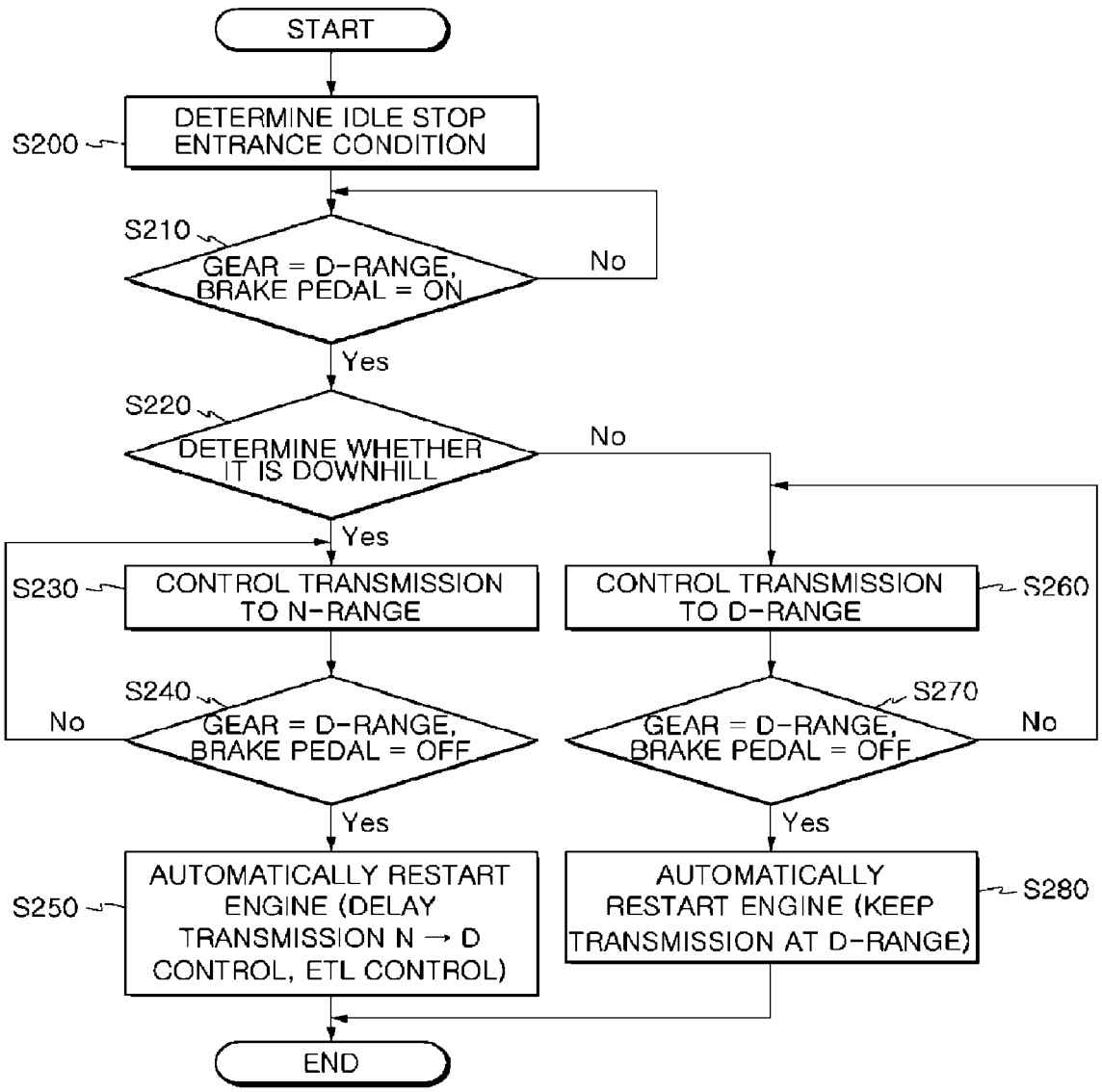
FIG. 2 is a flowchart illustrating an exemplary method of controlling ISG logic according to the present invention.

Referring to FIG. 2, an idle stop entrance condition is determined first (S200) for a vehicle equipped with an ISG system (hereafter, referred to as an ISG vehicle), and when the brake pedal is pressed down and the vehicle that travels is stopped with the gear at the D (Drive)-range, that is, when the brake pedal becomes ON (S210), an inclination sensor in the ISG vehicle measures the inclination of the road where the ISG vehicle is positioned.

It is determined whether the road where the ISG vehicle is positioned is a level ground, an uphill, or a downhill on the basis of the measured inclination (S220).

When the road is determined as a downhill on the basis of the measured inclination ("Yes" in S220), the vehicle is internally controlled to the N (Neutral) state from the idle stop state, regardless of the gear at the D-range (S230).

That is, the gear of the shift lever switch is kept showing the D state even in the idle stop, but the vehicle is internally controlled to the N-range, regardless of the gear, Next, when the brake pedal is released with the gear at the D state, that is, when the brake pedal becomes OFF (S240), the engine is restarted (S250), in which the vehicle is internally switched from the N state to the D state.

When the vehicle is internally switched from the N state to the D state, switching to the D state is delayed to prevent an impact by shifting.

Further, an impact due to OFF of the brake at the D state when the engine is restarted is minimized by controlling the hydraulic pressure of the transmission at the neutral level, keeping the transmission clutch OFF, and keeping the hydraulic pressure of a transmission oil sub-pump for controlling the transmission at the neutral, in order to internally control the vehicle to the N state.

Further, when the vehicle is restarted, the engine torque is controlled under a predetermine value by controlling an ETL (Engine Torque Limitation), which is for stability in movement of the vehicle when the driver presses down the acceleration pedal while restarting the vehicle.

On the other hand, when it is determined that the inclination of the road where the ISG vehicle is positioned is not a downhill on the basis of the inclination measured by the inclination sensor in the ISG vehicle ("No" in S220), for example, when the road is a level ground or an uphill, the idle stop is performed, with the gear held and controlled at the D state (S260).

That is, the start performance is ensured when the acceleration pedal is pressed down right after the vehicle is restarted, by keeping the hydraulic pressure of the D-range, even though the engine is stopped.

Further, the hydraulic pressure of the brake is keep, even though the engine stops, which is for preventing the vehicle from moving forward after it is restarted.

Next, when the brake pedal is released with the gear at the D state, that is, when the brake pedal becomes OFF (S270), the engine is restarted (S280), in which the ISG vehicle keeps the D state of the transmission.

Hereinafter, a device for controlling ISG logic according to various embodiments of the present invention is described in detail with reference to FIG. 3.

Referring to FIG. 3, a device for controlling ISG logic according to the present invention may include an ignition switch 10, a vehicle speed sensor 20, an accelerator sensor 30, a brake pedal switch 40, a transmission lever switch 50, an inclination sensor 60, a controller 70, and an engine unit 80.

The following conditions should be satisfied, with ignition switch 10 ON, in order to automatically stop an engine 85, that is, perform the idle stop, when the ISG vehicle stops to wait the traffic lights.

That is, an output signal of vehicle speed sensor 20 should show "0 (zero)" and an output signal of accelerator sensor 30 should show that the acceleration pedal is not pressed down.

Further, there is a prior condition that the temperature of the transmission oil should be in a predetermined range and the engine RPM should be under a predetermined value.

In this state, when the driver presses down the brake pedal, with the gear at the D state in the vehicle, that is, when the brake pedal becomes ON, the idle stop is performed.

Shift lever switch 50 shows the current state of the gear of the vehicle. That is, whether the gear of the vehicle is at the D (Drive) state or the N (Neutral) state is shown.

Inclination sensor 60 mounted in the vehicle determines an incline of the road where the vehicle is positioned, and measures the inclination.

It determines whether the road where the vehicle is positioned is a level ground, an uphill, or a downhill, on the basis of the inclination measured by inclination sensor 60.

Controller 70 internally controls the vehicle to the N-range, regardless of the gear shown by shift lever switch 50, for the vehicle that is on a downhill, on the basis of the measured inclination.

That is, shift lever switch 50 is kept showing the D state even in the idle stop, but the vehicle is internally controlled to the N-range, regardless of the gear.

For this configuration, an impact due to OFF of the brake at the D state when the engine is restarted is minimized by controlling the hydraulic pressure of the transmission at the neutral level, keeping the transmission clutch OFF, and keeping the hydraulic pressure of a transmission oil sub-pump for controlling the transmission at the neutral.

Further, controller 70 controls the engine torque under a predetermined value by controlling ETL (Engine Torque Limitation), when the brake pedal becomes OFF and the vehicle is restarted, with the gear of the vehicle at the D state.

This is for stability in the movement of the vehicle, when the driver presses down the acceleration pedal while restarting the vehicle.

Further, controller 70 internally switches the vehicle from the N state to the D state, when the brake pedal becomes OFF and the vehicle is restarted, with the gear of the vehicle at the D state, in which switching to the D state is delayed to prevent an impact due to shifting.

Engine unit 80 performs the idle stop, that is, stops engine 85, when the brake pedal becomes ON, with the gear of the vehicle at the D state, and restarts the stopped engine, when the brake pedal becomes OFF, with the gear of the vehicle at the D state.

According to various embodiments of the present invention, it is possible to control the ISG logic in consideration of the inclination, in accordance with the inclination of the road where the ISG vehicle is positioned now, by measuring the inclination of the road with the inclination sensor in the ISG vehicle.

Further, it is possible to provide a method of controlling ISG logic which can ensure stable start of the ISG vehicle even on a downhill, by internally controlling the transmission to the neutral state, when the ISG vehicle is on a downhill.

Furthermore, it is possible to ensure stability in movement of the vehicle, without an impact due to shifting, by internally delaying shifting the vehicle and limiting the engine torque under a predetermined value, in restarting the engine.

For convenience in explanation and accurate definition in the appended claims, the terms front and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling idle stop & go (ISG) logic, the method comprising:
   (a) determining whether a brake pedal becomes ON, with a gear at a D (Drive) state while an ISG vehicle travels;
   (b) determining whether a road is a downhill, by measuring the inclination of the road with an inclination sensor mounted in the ISG vehicle, when the brake pedal becomes ON in the step (a);
   (c) internally controlling the vehicle to an N (Neutral) state, regardless of the gear at the D state, when the road is determined as a downhill in the step (b);
   (d) determining whether the brake pedal becomes OFF, with the gear at the D state; and
   (e) internally switching the vehicle from the N state to the D state, when the brake pedal becomes OFF in step (d);
   wherein in step (c), the internally controlling the vehicle to the N state includes keeping a hydraulic pressure of a transmission oil sub-pump at a minimum level to minimize an impact due to the OFF of the brake at the D state.

2. The method as defined in claim 1, wherein step (e) delays internally switching the vehicle from the N state to the D state.

3. The method as defined in claim 1, wherein step (e) further includes controlling engine torque under a predetermined value.

4. A device for controlling idle stop & go (ISG) logic that is mounted in a vehicle equipped with an ISG system, the device comprising:
- a brake pedal switch;
- a shift lever switch that shows the current state of a gear of the vehicle;
- an inclination sensor that is mounted in the vehicle and measures the inclination of a road where the vehicle is positioned;
- a controller that internally controls the vehicle to an N (Neutral) state, regardless of the gear range shown by the shift lever switch, for the vehicle on a downhill, in accordance with the measured inclination; and
- an engine unit that performed idle stop when the brake pedal becomes ON, with the gear of the vehicle at a D (Drive) state, and restarts the stopped engine when the brake pedal becomes OFF, with the gear of the vehicle at the D state;
- wherein the controller keeps a hydraulic pressure of a transmission oil sub-pump at a minimum level, when internally controlling the vehicle to the N state to minimize an impact due to the OFF of the brake at the D state.

5. The device as defined in claim 4, wherein the controller internally switches the vehicle from the N state to the D state, when the brake pedal becomes OFF, with the gear of the vehicle at the D state, and delays switching to the D state.

6. The device for as defined in claim 4, wherein the controller controls engine torque under a predetermined value, when the brake pedal becomes OFF, with the gear of the vehicle at the D state.

* * * * *